United States Patent [19]

Goodin

[11] 4,420,165
[45] Dec. 13, 1983

[54] MULTI-TRAILER ASSEMBLY

[76] Inventor: William K. Goodin, 8518 Macoma Drive, St. Petersburg, Fla. 33702

[21] Appl. No.: 205,921

[22] Filed: Nov. 12, 1980

[51] Int. Cl.³ .............................. B60P 3/08; B60P 3/10
[52] U.S. Cl. .................................. 280/414.1; 296/158; 414/460; 410/26
[58] Field of Search ............................... 296/157, 158; 280/414.1, 33.99 R, 33.99 T, 414 A, 415 R; 414/460, 461; 410/2, 3, 24, 26, 24.1, 28.1, 29.1

[56] References Cited

U.S. PATENT DOCUMENTS

| | | | |
|---|---|---|---|
| 2,698,629 | 1/1955 | Hall | 135/1 A |
| 3,677,425 | 7/1972 | Patten | 410/26 X |
| 3,718,227 | 2/1973 | Swift | 410/25 X |
| 3,817,545 | 6/1974 | Ward | 246/157 X |
| 3,915,322 | 10/1975 | Crovatto et al. | 414/461 |
| 3,970,203 | 7/1976 | Watson, Jr. | 280/414.1 X |
| 4,188,056 | 2/1980 | Watson | 296/157 |
| 4,219,208 | 8/1980 | Fuller et al. | 280/DIG. 14 X |

Primary Examiner—Joseph Paul Brust
Attorney, Agent, or Firm—Duckworth, Allen, Dyer & Pettis

[57] ABSTRACT

A trailer assembly is disclosed for transporting two vehicles. The trailer has an open-ended frame supported by at least two independent wheels so that one vehicle is merely towed and not supported by the trailer and the second vehicle is loaded on the trailer above the first vehicle and supported by the trailer's wheels.

6 Claims, 5 Drawing Figures

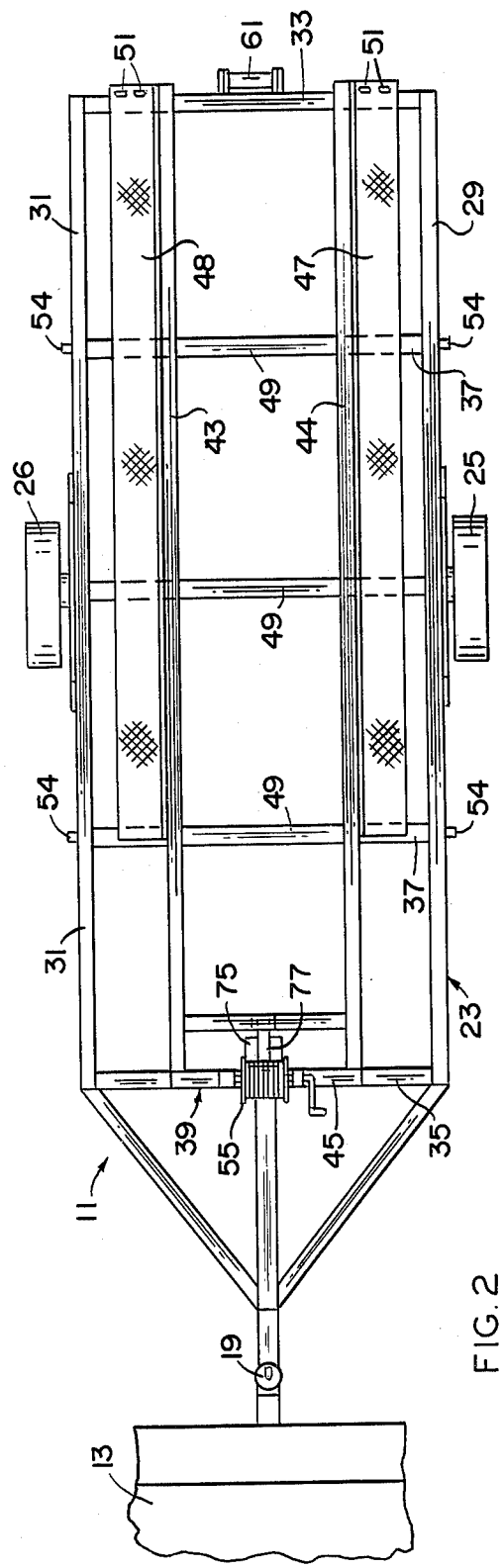
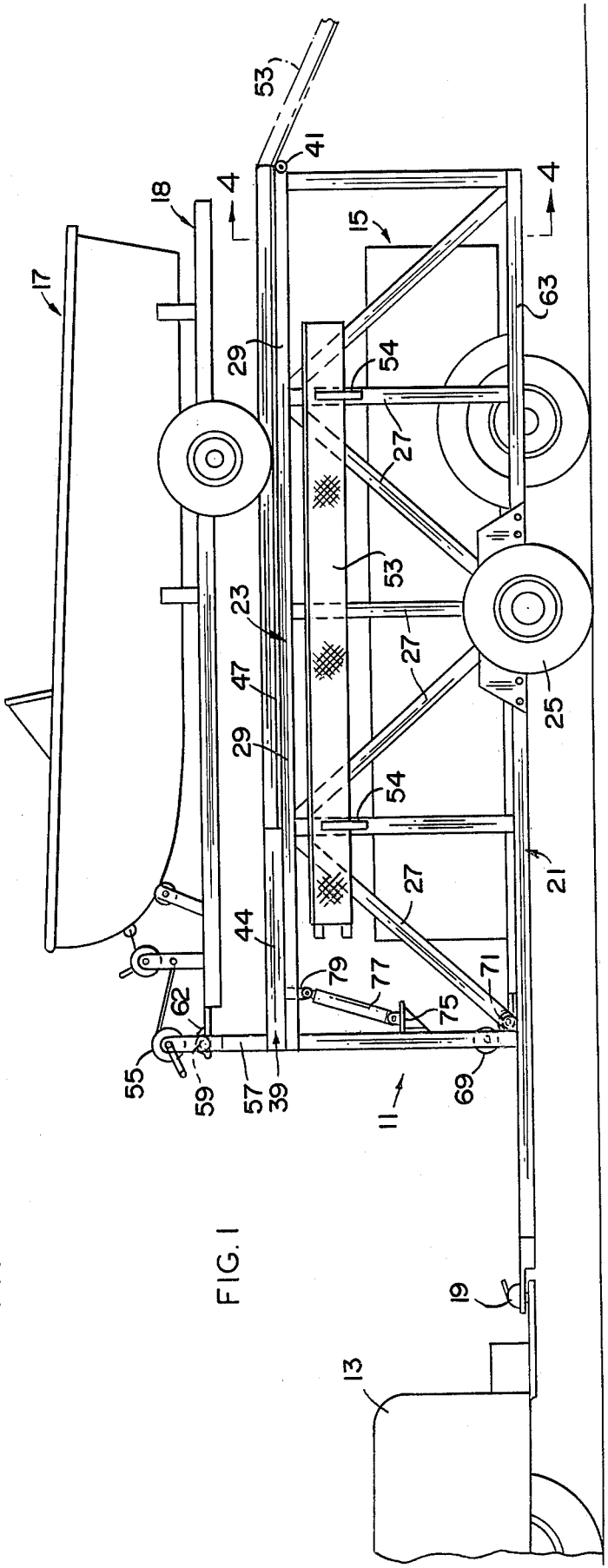
FIG. 2
FIG. 1

MULTI-TRAILER ASSEMBLY

BACKGROUND OF THE INVENTION

1. Field of the Invention

This invention relates to trailers in general and in particular trailers designed to carry two vehicles such as a boat and an off-road vehicle.

2. Description of the Prior Art

Camping is enjoying increasing popularity in the United States and it is increasingly desirable to camp on locations where boating is also possible. In many cases it is desirable to tow a boat and a camper vehicle, or off-road vehicles such as a jeep. A number of patents have been issued for a combination of boat and automobile trailer. Specifically U.S. Pat. No. 3,718,227 (Swift, Feb. 27, 1973), U.S. Pat. No. 3,970,203 (Watson, J. R., July 20, 1976), and U.S. Pat. No. 3,677,425(Patten, July 18, 1972). One of the disadvantages of the aforementioned patents is that the trailer supports the weight of both vehicles, thus requiring a significantly stronger construction and more expensive wheels for the trailer.

SUMMARY OF THE INVENTION

The trailer of the invention comprises an open-ended structure having a first open-ended base member with two wheels independent of one another and with no common axle. A second base member is disposed above the first base member and is supported by a plurality of struts the second base member supports one of the vehicles while the second vehicle can be towed underneath with the wheels of the second vehicle supporting the weight of the second vehicle.

BRIEF DESCRIPTION OF THE DRAWINGS

Further details of the invention are discussed below with the help of the drawings in which:

FIG. 1 is a side view of the trailer of the present invention;

FIG. 2 is a top view of an empty trailer;

DETAILED DESCRIPTION

Figure 3:
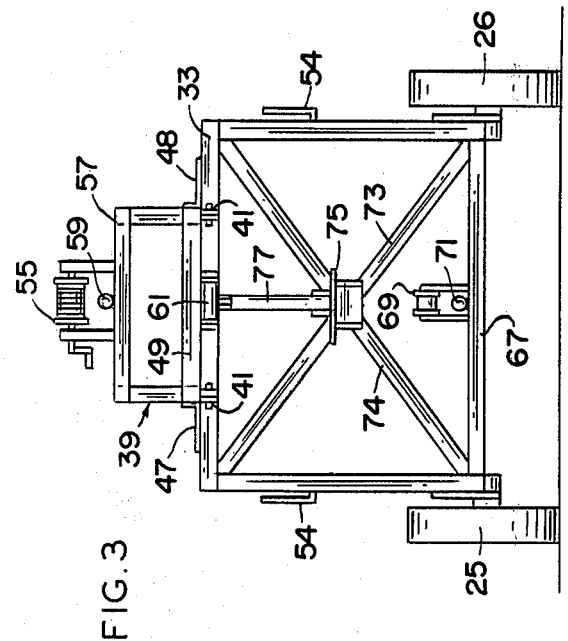
FIG. 3 is a rear view of the trailer.
Figure 4:
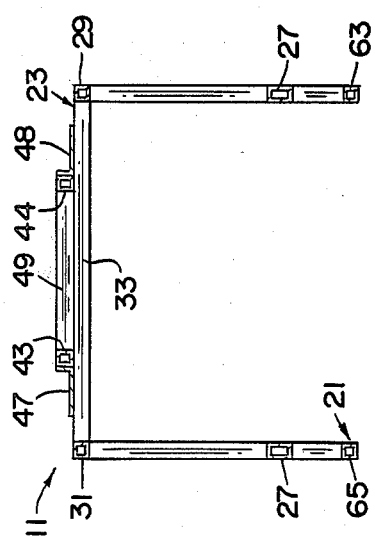
FIG. 4 is a sectional view across section 4 indicated in FIG. 1.

The trailer 11 of the present invention is illustrated in FIG. 1, being pulled by a pulling vehicle 13, such as an automobile. The trailer 11 is designed so as to carry two wheeled vehicles, such as a camper 15 and a boat 17, mounted on a boat trailer 18. The trailer 11 is coupled to the pulling vehicle 13 by means of a conventional trailer hitch 19. The trailer 11 is provided with two base member or support frames, a lower support frame 21 and an upper support frame 23. The lower support frame 21 is provided with wheels 25 and 26 which are independently mounted and have no common axle. The lower support frame 21 is joined to the upper support frame 23 by means of connecting truss members 27. The connecting truss members 27 are designed to distribute the load of the upper support frame 23 to the lower support frame 21 and the attached wheels 25 and 26.

As illustrated in FIG. 2 the upper support frame 23 comprises a rectangular frame having two longitudinal beams 29 and 31 coupled at the ends by two transverse end beams 33 and 35. A plurality of intermediate transverse beams 37 are connected to the longitudinal beams 29 and 31 for structural integrity and support.

A pivotable carrier platform 39 is disposed on the upper support frame 23 and is pivotally attached to transverse end beam 33 at pivots 41. The carrier platform 39 includes a pair of platform longitudinal beams 43 and 44 connected at the front by front transverse beam 45. Attached to the platform longitudinal beams 43 and 44 are a pair of wheel guides 47 and 48 having an L-shaped cross section. A plurality of transverse platform members 49 connect platform longitudinal beams 43 and 44 thus giving structural stability to the carrier platform 39. The wheel guides 47 and 48 are provided with holes 51 which are adapted to engage a pair of ramps 53. As better illustrated in FIG. 1 ramps 53 are used to aid in loading the vehicle to the carrier platform 39, and may be carried on the side of the trailer 11 by being coupled to hooks 54 attached to the connecting truss members 27.

As better illustrated in FIG. 3 the carrier platform 39 also includes a winch 55 attached to the front transverse beam 45 by means of winch platform 57. A conventional coupling ball 59 is secured to the winch platform 57. The coupling ball 59 can be used to engage a coupler 62 attached to, for example, boat trailer 18.

The rear transverse end beam 33 is provided with a roller 61 which is used in conjunction with the cable in winch 55 in the loading and unloading process.

The geometry of the lower support frame is best illustrated by the sectional view of Section 4 in comparison to the rear view of FIG. 3. Thus it is apparent that the lower support frame 21 consists of a pair of lower longitudinal beams 63 and 65 coupled at the front by a lower front transverse beam 67. The lower support frame 21 is therefore U-shaped, providing an inverted U-shaped cross section of the trailer 11. The inverted U-shaped cross section of the trailer 11 is a feature that allows a second vehicle to be pulled by the trailer without having the trailer bear the load of the weight of the second vehicle. To facilitate the carrying of a second vehicle a roller 69 is attached to the lower front transverse beam 67 and a coupling ball 71 is also attached to the lower front transverse beam 67. The coupling ball 71 is adapted to engage the vehicle to be pulled by the trailer, such as camper 15 or an off-road type vehicle.

Figure 5:
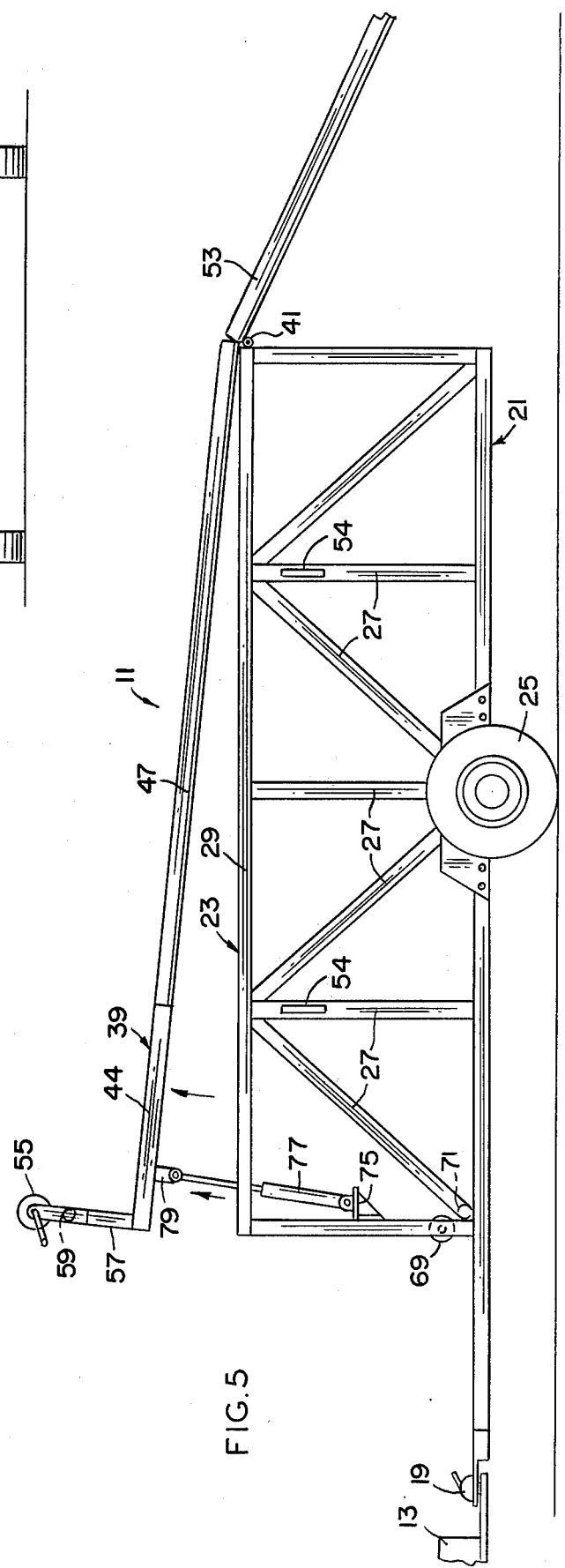
FIG. 5 is a side view of the unloading mechanism of the trailer.

Also illustrated in FIG. 3 are a pair of crossing beams 73 and 74 which connected the lower support frame 21 to the upper support 23 at the front of the trailer 11. Crossing beams 73 and 74 also give support to a jack platform 75. A hydraulic jack 77, or other similar mechanical device, is pivotally disposed on jack platform 75 and is pivotally connected to the pivotable carrier platform 39 at a joint 79. As illustrated in FIG. 5, hydraulic jack 77 may be extended in order to provide an inclination to the pivotable carrier platform 39, thereby utilizing a component of the force of gravity in the unloading of a vehicle carried in the pivotable carrier platform 39.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a mater of language, might be said to fall therebetween.

Now that the invention has been described, what is claimed is:

1. A trailer for simultaneously transporting a first boat vehicle and a second wheeled vehicle with a third vehicle comprising:
    a first base member having two longitudinal horizontal portions joined at one end with a transverse horizontal section;
    at least one trailer wheel independently attached to each longitudinal horizontal portion;
    a second base member disposed above the first base member and having two longitudinal horizontal portions connected by at least two transverse horizontal sections;
    a plurality of struts attached to and connecting the first and second base member;
    a U-shaped frame pivotally connected to the second base member, and two wheel guides attached to the U-shaped frame for supporting the first vehicle theron;
    means for connecting the first base member to a pulling vehicle; and
    means for coupling the second vehicle to be transported to the first base member whereby the weight of the second vehicle to be transported is self-supported and the trailer wheels support only the weight of the first vehicle to be transported and the trailer.

2. The trailer of claim 1 further comprising means coupled to the U-shaped frame for lifting one end of the U-shaped frame, whereby the first vehicle can be rolled off the U-shaped frame for unloading.

3. The trailer of claim 2 further comprising a winch connected to the second base member.

4. The trailer of claim 3 wherein the means for connecting comprises a trailer hitch.

5. The trailer of claim 4 wherein the means for coupling comprises a hitch attached to the second vehicle.

6. The trailer of claim 5 further comprising a roller connected to the transverse horizontal section of the first base member; and means for coupling the winch to the hitch attached to the second vehicle.

* * * * *